United States Patent
Neff et al.

(10) Patent No.: US 7,517,392 B2
(45) Date of Patent: Apr. 14, 2009

(54) BREATHER SYSTEM AND METHOD OF USING THE SAME

(75) Inventors: Matthew L. Neff, Battle Creek, MI (US); Leonard P. Stoehr, Kalamazoo, MI (US); Leo Wenstrup, Portage, MI (US)

(73) Assignee: Dana Heavy Vehicle Systems Group LLC, Toledo, OH (US)

( * ) Notice: Subject to any disclaimer, the term of this patent is extended or adjusted under 35 U.S.C. 154(b) by 489 days.

(21) Appl. No.: 11/103,865

(22) Filed: Apr. 12, 2005

(65) Prior Publication Data
US 2006/0225388 A1  Oct. 12, 2006

(51) Int. Cl.
*B01D 45/00*  (2006.01)

(52) U.S. Cl. .............. 95/272; 55/444; 55/442; 55/445; 55/385.3; 55/385.4; 55/DIG. 19; 137/197; 137/176; 137/590; 138/42

(58) Field of Classification Search .......... 95/272; 55/444, 442, 445, 423, 385.3, 385.4, DIG. 19; 137/197, 176, 590; 138/42
See application file for complete search history.

(56) References Cited

U.S. PATENT DOCUMENTS

| | | | |
|---|---|---|---|
| 1,306,421 A | * | 6/1919 | Feltz ........................ 55/443 |
| 1,367,164 A | * | 2/1921 | Miller ....................... 55/441 |
| 2,880,744 A | | 4/1959 | Daley, Jr. |
| 3,145,582 A | | 8/1964 | Wagner |
| 3,314,306 A | | 4/1967 | Barclae |
| 3,524,437 A | * | 8/1970 | Crandall .................... 123/573 |
| 4,351,203 A | | 9/1982 | Fukunaga |
| 4,506,562 A | | 3/1985 | Yamaura et al. |
| 4,794,942 A | | 1/1989 | Yasuda et al. |
| 4,970,913 A | | 11/1990 | Kielar et al. |
| 5,724,864 A | | 3/1998 | Rodgers et al. |
| 6,058,969 A | * | 5/2000 | Bollwahn et al. ........... 137/583 |
| 2007/0056400 A1 | * | 3/2007 | Kennedy .................... 74/607 |

* cited by examiner

*Primary Examiner*—Duane S Smith
*Assistant Examiner*—Douglas J Theisen
(74) *Attorney, Agent, or Firm*—Marshall & Melhorn, LLC

(57) ABSTRACT

The present invention comprises a breather system and a method of using the system. The assembly has a breather tube, a baffle system at least partially located within the breather tube and a drain back tube connected to the breather tube. The baffle system has a plurality of baffles designed to prevent lubricant from escaping a housing while still allowing air to pass into and out of the housing.

20 Claims, 3 Drawing Sheets

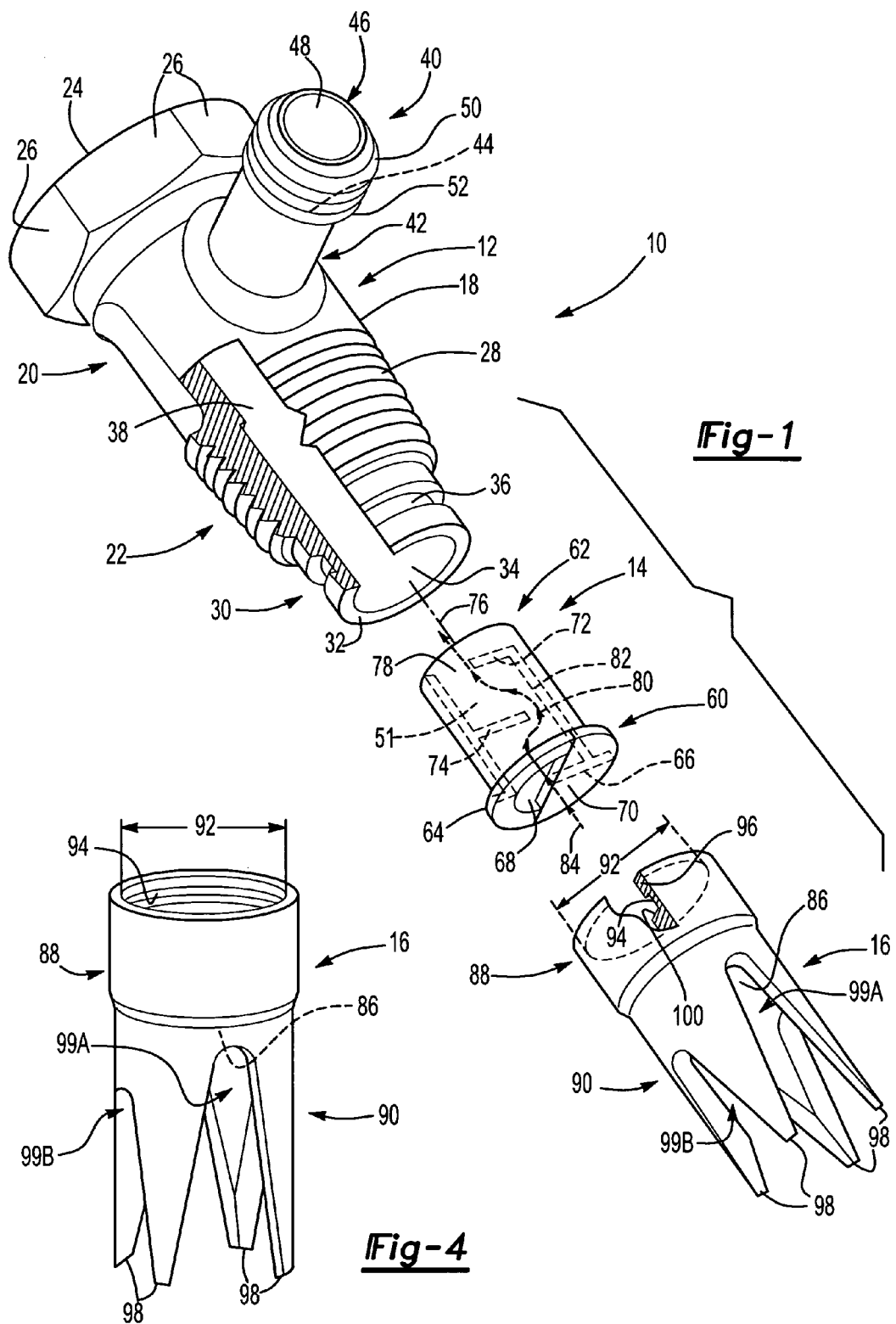

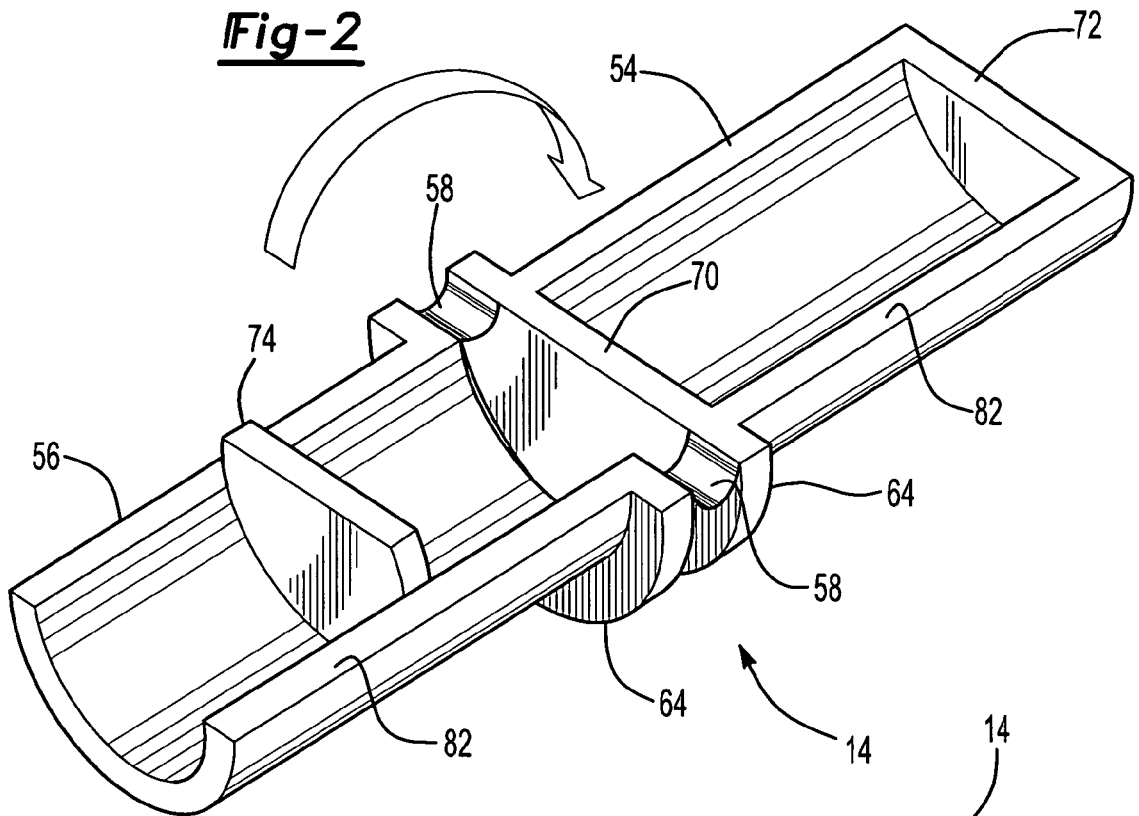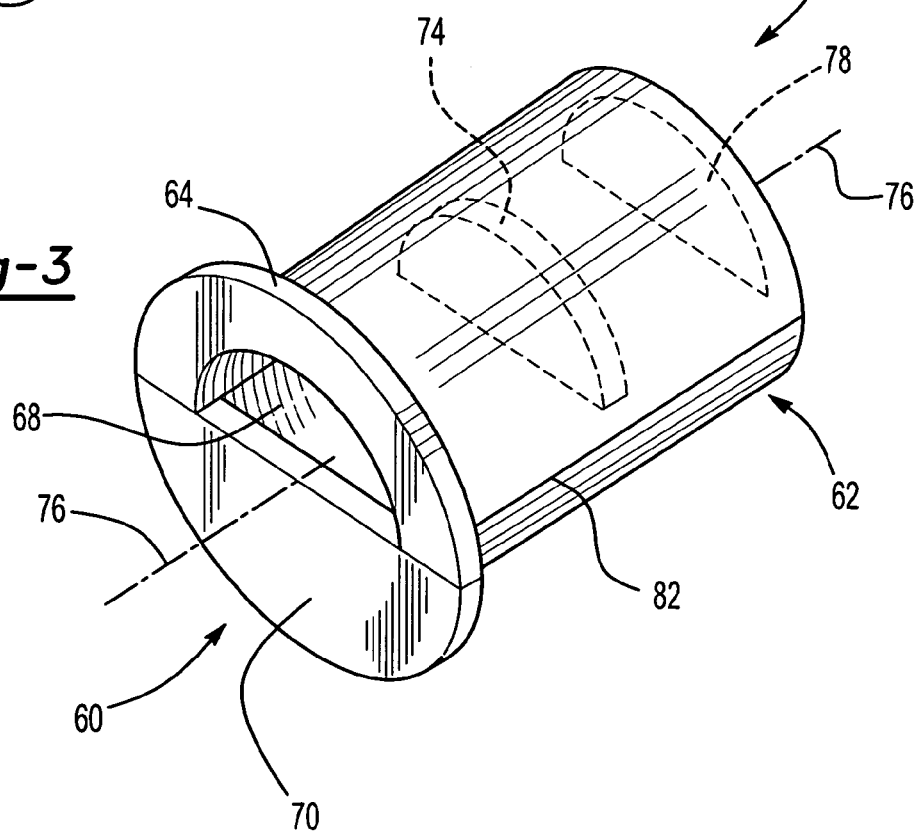

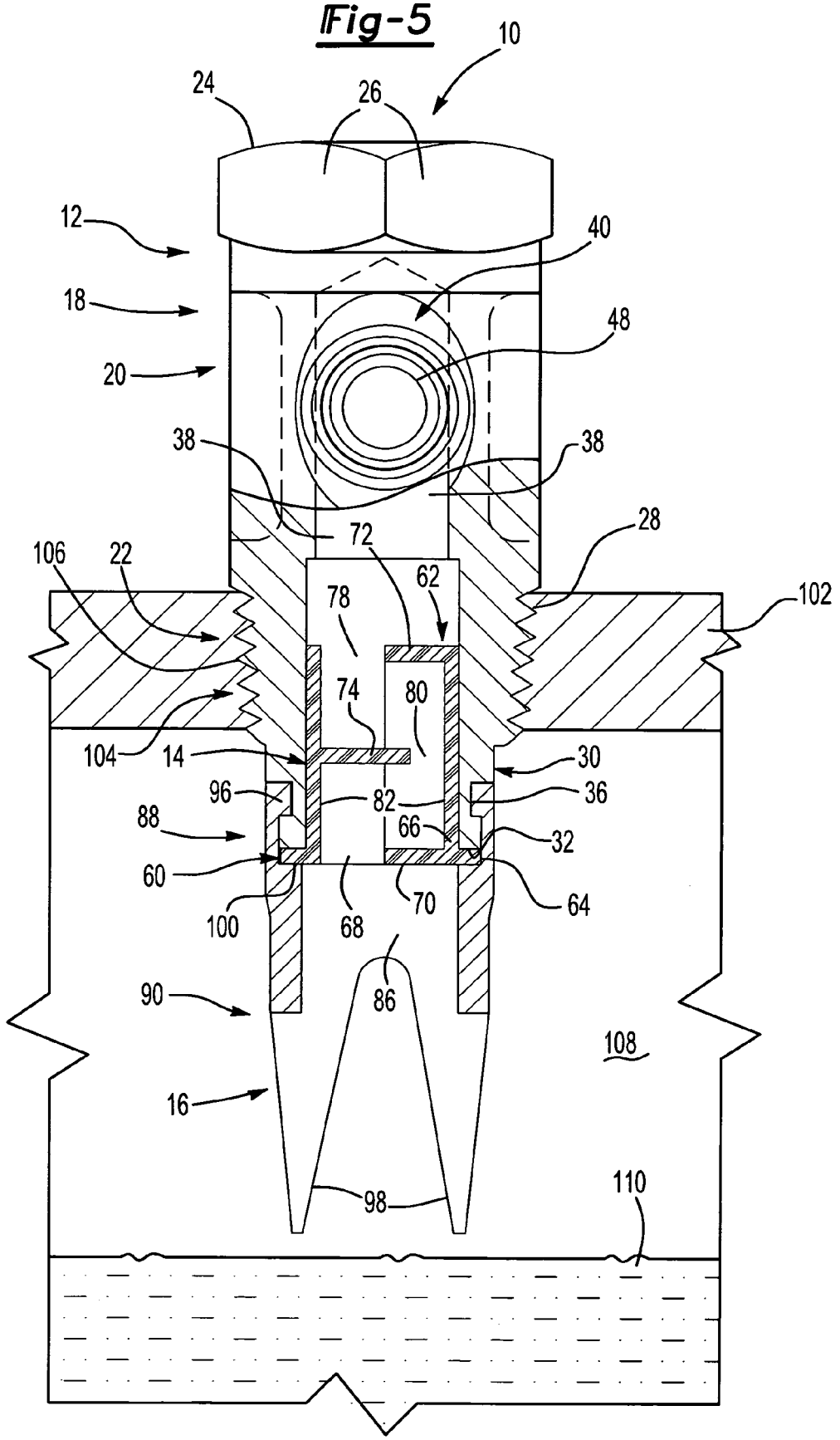

BREATHER SYSTEM AND METHOD OF USING THE SAME

FIELD OF THE INVENTION

The present invention relates to a breather system and a method of using the breather system. More particularly, the present invention relates to a breather system for a housing, for example a vehicle drive axle housing and a method of using the breather system with the housing.

BACKGROUND OF THE INVENTION

Breather assemblies for axle housings, transmission housings and other housings having rotatable elements therein and/or non-rotatable elements therein are well known for venting the interior of the housing to the atmosphere. The operation of the rotatable elements within these housings typically generates a certain amount of heat. The lubricant within the housings, used to facilitate the rotation of the rotatable elements, receives this heat. The heat increases the vapor pressure of the lubricant and the air, or gas, within the housing. If this pressure is not expelled from the housing, the lubricant will be undesirably forced through whatever sealing means are in place.

Various breather assemblies for the housings described above have been patented. For example, U.S. Pat. No. 2,880, 744 provides for a housing vent that includes a tubular vent body with a separate baffle disk mounted within the vent body.

U.S. Pat. No. 3,145,582 teaches a breather assembly having a single pair of baffle plates therein. The baffle plates are designed to collect any lubricant spray that may enter the breather and return to the case. The plates are also designed to also allow gas to escape from the case. The baffle plates have gas openings that are not aligned with one another to reduce the likelihood that fluid will go through both and escape through the assembly. The plates are described and depicted as located within a stand pipe of the assembly.

U.S. Pat. No. 4,794,942 teaches an air breather plug assembly having a cylindrical plug body and a cup-shaped baffle plate fixedly coupled within an inner end portion of the plug body. The baffle plate has a pair of radially spaced semicircular slots formed therein. The slots are designed to permit only a small amount of lubricant into the plug body. A resilient seal member, located above the baffle plate, has a slit that opens only if the pressure within the assembly exceeds a pre-determined amount. The resiliency of the seal member generally keeps the slit closed, thus maintaining the small amount of lubricant located within the plug body.

The above-described breather assemblies suffer from several disadvantages. First, the prior art breather assemblies have to be located above the lubricant level in the housing. Second, these breather assemblies have to be located at specific angles with respect to the housings to function properly. Third, despite their designs, the breather assemblies are known to allow lubricant, sometimes a significant quantity, to escape from the housing. Fourth, the prior art designs lack means to prevent a lubricant seal from forming against the base of the breather assembly thus blocking air from entering into and escaping from the housing. In light of the disadvantages of the prior art, a breather system that can be installed anywhere on a housing, at any angle, that significantly reduces, or prevents, lubricant from escaping from the housing, yet allows air into and out of the housing, is needed.

SUMMARY OF THE INVENTION

The present invention is directed toward a breather system having a breather tube, a baffle system and a drain back tube. The baffle system is located substantially within one end of the hollow interior of the breather tube. The baffle system has a first end partially closed by a first baffle, a second end partially closed by a second baffle and a third baffle positioned between the first baffle and the second baffle. The drain back tube has a plurality of legs and it is connected to the breather tube.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1 is an exploded view of a preferred embodiment of the breather system of the present invention;

FIG. 2 is a perspective view of a preferred embodiment of an interior of the baffle system of the present invention;

FIG. 3 is a perspective view of a preferred embodiment of the baffle system of the present invention;

FIG. 4 is a perspective view of a preferred embodiment of the drain back tube of the present invention; and FIG. 5 is a side view of the present invention depicting a preferred embodiment of the assembled breather system.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Referring now to FIG. 1, a preferred embodiment of the breather system 10, comprising a breather tube 12, a baffle system 14 and a drain back tube 16, of the present invention is depicted. The breather tube 12 has a body portion 18 having an upper portion 20 and a lower portion 22. The upper portion 20 has a structure 24, such as a bolt head, having a plurality of flats 26, such as wrench flats or socket flats. The lower portion 22 has a set of threads 28 integrally formed therewith. The lower portion 22 also has a reduced outside diameter section 30 that terminates in a bottom edge 32 having a substantially circular opening 34. Preferably, the reduced outside diameter section 30 has a circumferential groove 36.

The body portion 18 has a substantially hollow interior portion 38. Preferably, the interior portion 38 is generally cylindrical in shape and extends from the circular opening 34 to approximately the bolt head 24.

Between the set of threads 28 and the bolt head 24, a tube connector 40 preferably extends in a substantially horizontal direction with respect to the body portion 18. The tube connector 40 is generally cylindrical and may be integrally formed at a first end 42 with the body portion 18 or separately formed therefrom and joined to the body portion 18. Preferably, the tube connector 40 has a hollow interior 44 in fluid communication with the hollow interior 38 of the body portion 18.

The tube connector 40 preferably also has a second end 46. The second end 46 terminates in a generally circular opening 48. A fitting 50 is preferably located on an exterior surface 52 of the tube connector 40 adjacent the second end 46. The fitting 50 may be a set of threads, a series of alternating ridges and grooves and/or one or more barbs. The fitting 50 accepts a tubular hose (not shown), which is well known to those skilled in the art.

The breather tube 12 may be metallic, such as, for example, steel or brass; however, it is well within the scope of the present invention to construct the breather tube 12 from plastic materials and/or elastomeric materials. The breather tube 12 may also be constructed of any combination of the above-mentioned materials. For example, the upper portion 20 and some of the lower portion 22 of the breather tube 12 is preferably constructed from brass and the reduced diameter section 30 is injection molded onto the lower portion 22.

FIG. 1 also depicts a preferred embodiment of the baffle system 14 of the present invention. Preferably, the baffle system is constructed of plastic. By way of example only, the plastic may be such as an acrylonitrile-butadiene-styrene copolymer (ABS). Other materials such as rubber, synthetic rubber, nylon or similar materials are also within the scope of the present invention.

The baffle system 14 is preferably substantially tubular in overall shape; however, the baffle system 14 is not limited to merely tubular shapes. The baffle system 14 may be any shape that is complementary to the hollow interior portion 38 of the lower portion 22 of the body portion 18. Preferably, the baffle system 14 has an interior 51 that is at least partially hollow.

In a preferred embodiment, the baffle system 14 has a first portion 54 and a second portion 56, as shown in FIG. 2. Preferably, the first portion 54 comprises half of the tubular shape of the baffle system 14 and the second portion 56 comprises the other half of the tubular shape, however, the first portion 54 and the second portion 56 may comprise any percentage of the tubular shape.

The first portion 54 and the second portion 56 are preferably joined by at least one hinge 58 and more preferably the portions 54, 56 are joined by two hinges 58. The hinges 58 are integrally formed with the first portion 54 and the second portion 56, although the present invention functions equally well without the hinges 58. Preferably, the hinges 58 are formed of a flexible material.

Preferably, the baffle system 14 has a first end 60 and a second end 62, as best seen in FIGS. 1 and 3. The first end 60 has a circumferential radially extending edge 64. In the preferred embodiment, the radially extending edge 64 is located at the terminus 66 of the first end 60. The radially extending edge 64, however, may be located anywhere on the first end 60 of the baffle system 14.

The first end 60 of the baffle system 14 also has an opening 68 therein. In the depicted preferred embodiment, the opening 68 is semi-circular. Those skilled in the art will appreciate, however, that the opening 68 can be of any shape or design and it is not limited to being semi-circular in shape. The remaining portion of the first end 60 is closed by a first baffle 70.

The first baffle 70 may be a solid plate or wall designed to deflect, check, regulate and/or limit the flow of lubricant from a housing, described in more detail below. The first baffle 70 may also be a porous, or mesh, plate or wall also designed to deflect, check, regulate and/or limit the flow of lubricant from the housing. The above description and function of the first baffle 70 applies to a second baffle 72 and a third baffle 74 which are described below. Those skilled in the art will appreciate that one or more of the baffles 70, 72, 74 may be solid or one or more of the baffles 70, 72, or 74 may be porous, all in the same baffle system 14.

Preferably, the first baffle 70, the second baffle 72 and the third baffle 74 are located in the baffle system 14 substantially orthogonal with a vertical axis 76 of the baffle system 14, as seen in FIGS. 1 and 3. The present invention, however, is not limited to locating the baffles 70, 72, 74 in strictly an orthogonal orientation. Instead, one or more of the baffles 70, 72, 74 may be located anywhere between 45 degrees to 135 degrees with respect to the vertical axis 76 of the baffle system 14.

The second end 62 of the baffle system 14 has an opening 78 therein, as shown in FIGS. 1 and 3. Preferably, the opening 78 is semi-circular in shape, however, the opening 78 can be of any shape or design and it is not limited to being semi-circular in shape. The remaining portion of the second end 62 is closed by the second baffle 72.

FIG. 1 depicts the preferred embodiment of the present invention where the first baffle 70 and the second baffle 72 are substantially axially aligned with, but axially offset from, one another. Preferably, the first baffle 70 and the second baffle 72 are substantially axially aligned with one another, however, it is within the scope of the present invention for the first and second baffles 70, 72 to have deviations in their alignment.

FIGS. 1 and 2 depict a third baffle 74 in the baffle system 14 located between the first baffle 70 and the second baffle 72. Preferably, the third baffle 74 is located substantially equidistant from the first baffle 70 and the second baffle 72, however, it is well within the scope of the present invention to locate the third baffle 74 anywhere between the first baffle 70 and the second baffle 72.

In the preferred embodiment, the third baffle 74 defines a substantially semi-circular opening 80 with the tubular wall 82 of the baffle system 14, as shown in FIG. 1. The opening 80 defined by the third baffle 74 may be any shape or design and it is not limited to only a semi-circular shape.

Preferably, the third baffle 74 is positioned within the baffle system 14 in a staggered, or alternating, relationship with respect to at least one other baffle 70 or 72, as best seen in FIG. 1. In a most preferred embodiment, the third baffle 74 is axially staggered with both the first baffle 70 and the second baffle 72. In this staggered orientation, the third baffle 74 may or may not at least partially axially overlap the first 70 and/or the second baffle 72. It is preferred that the third baffle 74 be, at least partially, in an axially overlapping relationship with the first opening 68 and the second opening 78.

Regardless of the orientation of the first baffle 70, the second baffle 72 or the third baffle 74 with respect to one another, it is preferred that the baffles 70, 72, 74 are positioned so that a continuous air passageway 84, as shown in FIG. 1, is present through the baffle system 14.

Referring now to FIGS. 1 and 4, a preferred embodiment of the drain back tube 16 of the present invention is depicted. The drain back tube 16 is substantially tubular in shape and has a hollow interior portion 86. Preferably, the drain back tube 16 has an upper portion 88 and a lower portion 90. Preferably, the upper portion 88 has a slightly larger inside diameter 92 as compared to the reduced outside diameter section 30 of the breather tube 12.

An inside surface 94 of the upper portion 88 preferably has a circumferential lip 96 that has a complementary shape to the circumferential groove 36 of the reduced diameter section 30 of the breather tube 12.

The lower portion 90 of the drain back tube 16 has a plurality of legs 98. Preferably, the legs 98 taper away from the upper portion 88, however, those skilled in the art will appreciate that they may be any shape. As shown in FIGS. 1 and 4, the lower portion 90 preferably has four tapered legs 98. The present invention, however, is not limited to four legs 98 as any number of legs 98, greater or fewer than four, may be used without departing from the scope of the present invention.

The preferred embodiment also has one of at least two types of recesses extending upwardly into the drain back tube 16 between each of the legs 98, as best seen in FIG. 1. A first type of recess 99A extends almost to the upper portion 88. A second type of recess 99B does not extend as far upwardly into the drain back tube 16 as the first type of recess 99A. Although the present invention describes and depicts two types of recesses 99A, 99B, it is within the scope of the present invention to have recesses having multiple depths and shapes and which are located in any order between the legs 98.

A preferred method of using the above-described invention includes locating the baffle system 14 into the lower portion 22 of the breather tube 12. Preferably, before this step, the first portion 54 and second portion 56 of the baffle system 14, as shown in FIG. 2, are brought together. The first portion 54 and the second portion 56 are folded so that they are adjacent one another by virtue of the hinge 58, or hinges, as the case may be.

Those skilled in the art will appreciate that the baffle system 14, including the hinge 58 and the baffles 70, 72, 74, can be molded or cast as a single piece, or as two joined pieces as shown in FIG. 2. By molding or casting the baffle system 14, the first portion 54 can have integrally formed therewith any number of baffles 70, 72, or 74, as can the second portion 56. The present invention, however, is in no way limited to only forming the baffle system 14 by molding or casting.

The baffle system 14 is then inserted into the breather tube 12 until the radially extending edge 64 on the first end 60 of the baffle system 14 engages the bottom edge 32 of the lower portion 22 of the breather tube 12, as shown in FIG. 5. The drain back tube 16 is attached to the breather tube 12 by locating the circumferential lip 96 of the drain back tube 16 into the circumferential groove 36 in the breather tube 12. Preferably, the drain back tube 16 has an interior ledge 100 that abuts the radially extending edge 64 of the baffle system 14. Based upon this description and FIG. 5, it can be understood that when assembled the drain back tube 16 overlaps the radially extending edge 64 of the baffle system 14 and reduced diameter section 30 of the breather tube 12.

Those skilled in the art will appreciate that the drain back tube 16 can be a separately formed, individual piece that is manually or automatically secured to the breather tube 12. In the preferred embodiment, however, the drain back tube 16 is injection molded about the lower portion 22 of the breather tube 12.

The drain back tube 16 may be constructed of plastic, rubber, synthetic rubber or similar products. In a preferred embodiment, the drain back tube 16 is constructed of nylon. By way of example only, the drain back tube 16 may be constructed of BASF Ultramid nylon.

The breather system 10, including the breather tube 12, the baffle system 14 and the drain back tube 16 are then installed in a housing 102, as shown in FIG. 5. The breather system 10 may be located anywhere on the housing 102, and at any angle with respect to the housing 102. In the preferred embodiment depicted in FIG. 5, the breather system 10 is inserted into the housing 102 in a substantially perpendicular position.

An aperture 104 extends completely through the housing 102. The aperture 104 includes a complementary set of threads 106 to those on the breather tube 12. The breather system 10 is inserted into the aperture 104 in the housing 102 and rotated so that the two sets of threads 28, 106 engage with one another. The breather system 10 may be rotated by hand, with a manual tool, such as a wrench, or a powered tool, such as an air driven wrench. Preferably, the breather system 10 is located into the housing 102 until the two sets of threads 28, 106 are fully engaged and/or until a fluid tight seal is formed between the breather system 10 and the housing 102.

It can now be appreciated that the air within an interior portion 108 of the housing 102 is in communication with the atmosphere outside of the housing 102 by virtue of the breather system 10. Air within the interior portion 108 can flow past the first baffle 70, past the second baffle 72 and past the third baffle 74 of the baffle system 14 into the breather tube 12. The air may then continue through the interior portion 38 of the breather tube 12. The air will then move from the interior portion 38 of the breather tube 12 to the interior 44 of the tube connector 40 where it eventually reaches the atmosphere. Air moving into the housing 102 from the atmosphere simply follows the above-described path in reverse.

Although air is allowed to freely move from the interior portion 108 of the housing 102 to the atmosphere, fluid within the housing 102, such as a lubricant 110, is prevented from doing so by virtue of the baffle system 14 and the drain back tube 16. The tapered plurality of legs 98 of the drain back tube 16 prevent a significant quantity, if not all, of the lubricant 110 that is being splashed or thrown against them from entering into the upper portion 88 of the drain back tube 16. The legs 98 are also a highly variable surface that makes it very difficult for the lubricant 110 to form an airtight seal against. Additionally, the variability of the recesses 99A, 99B between the legs 98 prevents, or reduces the likelihood of, the lubricant 110 forming an airtight seal in the drain back tube 16. Those skilled in the art can appreciate that the formation of a lubricant seal in the breather system 10 can create a vacuum within the breather system 10 thus reducing the effectiveness of the breather system 10, if not disabling it.

All of, or the majority of, any lubricant 110 which is splashed or thrown against the breather system 10, or which otherwise comes in contact with the breather system 10, is also prevented escaping as it is blocked by the first baffle 70. In the unlikely event that lubricant 110 escapes past the first baffle 70, the third baffle 74, located in the axially staggered location described above, blocks the lubricant 110 from moving further into the baffle system 14. Should the lubricant 110 move past the third baffle 74, the second baffle 72, staggered axially from the third baffle 74 would prevent the lubricant 110 from advancing further.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A breather system, comprising:
    a breather tube having an upper portion, a lower portion and a hollow interior, said breather tube located within an aperture of a housing containing a liquid; and
    a drain back tube having a plurality of legs with recesses having variable depths between said legs defining a lower portion of said drain back tube, said drain back tube being connected to said lower portion of said breather tube, thereby said legs and said recesses prevent lubricant in said housing from forming a liquid seal in said drain back tube.

2. The system of claim 1, further comprising a baffle system at least partially located within said hollow interior of said breather tube, said baffle system comprising a first end, a second end and an interior portion, wherein said first end is partially closed by a first baffle and said second end is partially closed by a second baffle and wherein a third baffle is located within said interior portion of said baffle system between said first baffle and said second baffle;

wherein said drain back tube has an upper portion and a lower portion, wherein said upper portion of said drain back tube is connected to said lower portion of said breather tube, and wherein said lower portion of said drain back tube defines said plurality of legs.

3. The system of claim 2, wherein said lower portion of said drain back tube has four tapered legs and one of at least two types of recesses are located between each of said legs where one type of recess extends further upwardly toward said upper portion than the other type of recess.

4. The system of claim 2, wherein said upper portion of said drain back tube overlaps said first end of said baffle system and said upper portion of said drain back tube also at least partially overlaps said lower portion of said breather tube.

5. The system of claim 2, wherein said first end of said baffle system has a circumferential radially extending edge, said edge abutting a lower edge of said lower portion of said breather tube.

6. The system of claim 2, wherein at least two of said baffles are axially staggered with respect to one another.

7. The system of claim 2, wherein said first baffle has an opening into said baffle system.

8. The system of claim 7, wherein said third baffle has an opening, said third baffle opening at least partially axially overlapping said first baffle.

9. The system of claim 8, wherein said second baffle has an opening, said second baffle opening at least partially axially overlapping said third baffle.

10. The system of claim 2, wherein said breather tube, said drain back tube and said baffle system define a continuous air passageway.

11. A breather system, comprising:
a breather tube having a hollow interior;
a drain back tube connected to said breather tube, said drain back tube having a plurality of axially extending tapered legs; and
a baffle system located at least partially within said interior of said breather tube, said baffle system having at least three axially staggered baffles and a hinge.

12. The system of claim 11, wherein said breather tube, said drain back tube and said baffle system define a continuous air passageway.

13. The system of claim 11, wherein said baffle system has a first portion and a second portion, and said first portion and said second portion are joined with said hinge, said hinge being integrally formed with both of said portions.

14. The system of claim 11, wherein one of at least two types of recesses extend between each of said legs.

15. A method of venting a housing, comprising:
providing a substantially closed housing containing a liquid;
locating a breather tube within an aperture of said housing; and
connecting a drain back tube having a plurality of tapered legs with recesses having varying depths between said legs, with at least said breather tube, said legs and said recesses preventing lubricant from forming a liquid seal in said drain back tube.

16. The method of claim 15, further comprising attaching a baffle system to said breather tube, said baffle system utilizing staggered baffles to prevent said liquid from escaping from said housing through said breather tube, said staggered baffles providing a substantially continuous air passageway therethrough for venting said housing.

17. The system of claim 16, wherein said baffle system is formed by folding together a first portion and a second portion of said baffle system via at least one hinge integrally formed with said first portion and said second portion, wherein said first portion has integrally formed therewith at least two baffles and said second portion has at least one baffle integrally formed therewith.

18. A drain back tube, comprising:
an upper portion;
a lower portion having a plurality of legs, wherein a recess is located between each of said legs, said recesses having variable depths between said legs; and
a substantially hollow interior portion connecting said upper portion and said lower portion;
thereby said legs and said recesses prevent lubricant in a housing from forming a liquid seal in said drain back tube.

19. The drain back tube of claim 18, wherein said legs are tapered and at least two of said recesses extend into said lower portion to different depths from one another.

20. The drain back tube of claim 18, wherein said upper portion is connected to a breather tube.

* * * * *